US008199302B2

(12) United States Patent
Hong

(10) Patent No.: US 8,199,302 B2
(45) Date of Patent: Jun. 12, 2012

(54) IN PLANE SWITCHING MODE LIQUID CRYSTAL DISPLAY DEVICE AND FABRICATION METHOD THEREOF

(75) Inventor: Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/043,114

(22) Filed: Mar. 8, 2011

(65) Prior Publication Data

US 2011/0157534 A1 Jun. 30, 2011

Related U.S. Application Data

(62) Division of application No. 10/950,896, filed on Sep. 27, 2004, now abandoned.

(30) Foreign Application Priority Data

Oct. 9, 2003 (KR) .......................... 10-2003-0070131

(51) Int. Cl.
*G02F 1/1343* (2006.01)

(52) U.S. Cl. ........................ 349/141; 349/110; 349/106

(58) Field of Classification Search .................. None
See application file for complete search history.

(56) References Cited

U.S. PATENT DOCUMENTS

| 5,598,285 | A | 1/1997 | Kondo et al. |
| 5,745,207 | A | 4/1998 | Asada et al. |
| 5,838,037 | A | 11/1998 | Masutani et al. |
| 5,866,919 | A * | 2/1999 | Kwon et al. ................... 257/59 |
| 5,946,060 | A | 8/1999 | Nishiki et al. |
| 5,990,987 | A | 11/1999 | Tanaka |
| 6,028,653 | A | 2/2000 | Nishida |
| 6,097,454 | A | 8/2000 | Zhang et al. |
| 6,118,505 | A | 9/2000 | Nagata et al. |
| 6,266,166 | B1 | 7/2001 | Katsumata et al. |
| 6,288,763 | B1 | 9/2001 | Hirota |
| 6,297,866 | B1 | 10/2001 | Seo et al. |
| 2002/0021374 | A1 | 2/2002 | Kikkawa et al. |
| 2002/0044249 | A1 | 4/2002 | Hirota |
| 2003/0020851 | A1 * | 1/2003 | Kim et al. ..................... 349/106 |
| 2003/0025857 | A1 | 2/2003 | Ochiai et al. |

FOREIGN PATENT DOCUMENTS

| JP | 10-003092 | 1/1998 |
| JP | 2001-154636 | 6/2001 |
| KR | 2000-0071583 | 11/2000 |
| KR | 2001-0009157 | 2/2001 |

OTHER PUBLICATIONS

Office Action issued in corresponding Korean Patent Application No. 10-2003-0070131; issued May 24, 2010.

* cited by examiner

*Primary Examiner* — Lucy Chien
(74) *Attorney, Agent, or Firm* — Brinks Hofer Gilson & Lione

(57) ABSTRACT

An IPS mode LCD includes first and second substrates. A thin film transistor and a color filter layer are formed on the first substrate. A common electrode and a pixel electrode are arranged in a zigzag configuration on the first substrate. A liquid crystal layer is disposed between the first and second substrates.

14 Claims, 10 Drawing Sheets

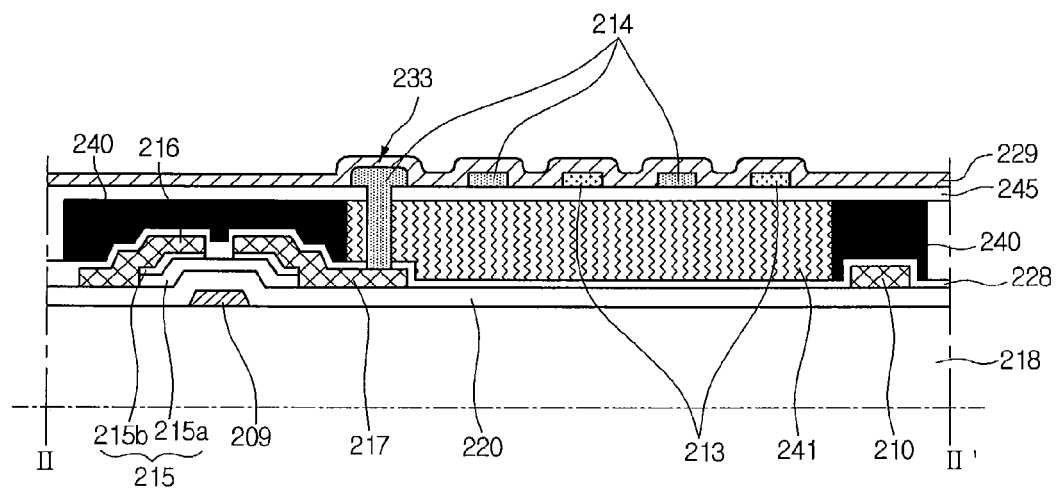
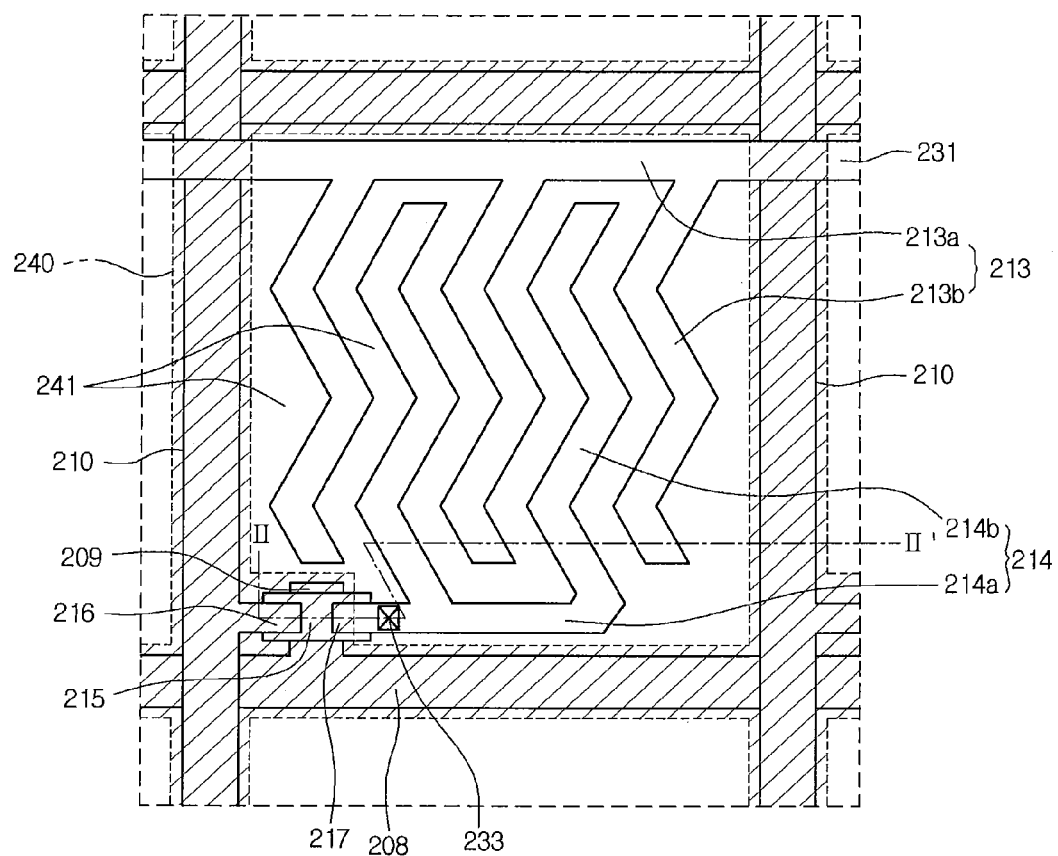

IN PLANE SWITCHING MODE LIQUID CRYSTAL DISPLAY DEVICE AND FABRICATION METHOD THEREOF

CLAIM FOR PRIORITY

The present patent document is a divisional of U.S. patent application Ser. No. 10/950,896, filed Sep. 27, 2004, which claims priority to Korean Application No. P2003-70131, filed on Oct. 9, 2003, which is hereby incorporated by reference.

BACKGROUND

1. Technical Field

The present invention relates to a liquid crystal display device (LCD), and more particularly, to an In-Plane Switching (IPS) mode LCD in which a color filter layer and a thin film transistor are formed on the same substrate to drive the liquid crystal using a fringe field.

2. Description of the Related Art

In general, a cathode ray tube (CRT) has been most widely used among display devices for displaying image information on a screen. However, CRTs are large and heavy compared with the display area. With the development of the electronic industry, the use of display devices has expanded to personal computers, notebook computers, wireless terminals, vehicle instrument panels, electronic display boards and the like. Also, due to the development of information communication technology, since it is possible to transmit a large amount of image information, increasing importance has been placed on a next generation display device capable of processing and displaying the large amount of image information.

Such next generation display devices are required to realize lighter, thinner, shorter and smaller characteristics, a high luminance, a large-sized screen, low power consumption and a low price. Among such next generation display devices, liquid crystal display devices (LCD) are used as they have excellent resolution compared with other flat displays and a fast response time considerable to that of the CRT in implementing a moving picture.

More specifically, twisted nematic (TN) mode LCDs have been generally used. In the TN mode type LCD, after electrodes are formed on two substrates and liquid crystal directors are aligned twisted by 90°, a driving voltage is applied to the electrodes to drive the liquid crystal directors. However, the TN mode LCD has a narrow viewing angle.

Recently, LCDs employing a new mode are being actively researched to increase the viewing angle. In-plane switching (IPS) mode LCDs, optically compensated birefringence mode LCDs, etc. are examples of such LCDs.

The IPS mode LCD generates a horizontal electric field to drive the liquid crystal molecules in a horizontal state with respect to the substrates by forming two electrodes on an identical substrate and applying a voltage between the two electrodes. In other words, the longer axis of the liquid crystal molecule does not stand up with respect to the substrates. To this end, the IPS mode LCD has a small variation in the birefringence of liquid crystal according to a visual direction and thus has an excellent viewing angle characteristic compared with the TN mode LCD.

FIG. 1 is a sectional view of a related art IPS mode LCD. Referring to FIG. 1, a related art IPS mode LCD is formed by attaching a first substrate 118 and a second substrate 119 facing the first substrate 118, and interposing a liquid crystal layer 130 therebetween. A metal film is first deposited on the first substrate 118 and is patterned to form a plurality of gate lines and a plurality of gate electrode 109 branched from the respective gate lines and formed at a thin film transistor region.

Next, a gate insulating layer 120 is formed on an entire surface of the first substrate including the gate electrode 109, and then a semiconductor layer 115 forming an ohmic contact layer with an active layer 115a is formed on a predetermined region of the gate insulating layer 120. On the gate insulating layer 120, a data line 110 forming a matrix configuration together with the gate line is formed.

In the course of forming the data line 110, source electrode 116 and drain electrode 117 of a thin film transistor are formed along with the data line 110. Also, a common line and a common electrode 113 are formed to be parallel with the gate line 110. Alternatively, the common line and the common electrode 113 may be formed on the same layer as the gate electrode 109.

On the entire surface of the first substrate 118 constructed as above, a passivation film 128 is formed. After that, a pixel electrode 114 is formed to be electrically connected with the drain electrode 117 and be parallel to the data line 110. On the entire surface of the first substrate 118 constructed as above, a first orientation film 129 is formed.

On the other hand, on the second substrate 119, a black matrix 121 for preventing light from being leaked is formed. A color filter layer 122 consisting of color patterns of red (R), green (G), and blue (B) is formed between the black matrixes 121. On the color filter layer 122, an overcoat layer 123 for planarizing an upper surface thereof and protecting the underlying color filter layer 122 is formed. Next, a second orientation film 126 is formed on the overcoat layer 123.

Edges between the first and second substrates 118 and 119 are sealed by a seal pattern (not shown) to prevent the liquid crystal layer 130 interposed between the first and second substrates 118 and 119 from being leaked. Attaching of the first and second substrates 118 and 119 is determined by a margin on design of each substrate. Generally, preciseness of a few micrometers is required. If the attaching margin deviates from an allowed margin, light is leaked and accordingly a desired characteristic is not obtained.

To realize high definition, integration of the LCD has increased and an interval between devices has narrowed. Accordingly, if even a minor error in attachment exists, corresponding devices are formed at misaligned sites, so that color reproducibility and production yield are lowered.

However, in the related art IPS mode LCD where the color filter layer and the thin film transistor are formed on different substrates, the attachment preciseness is lowered due to alignment margin between the color filter substrate and the array substrate. Also, since the color filter substrate and the array substrate are separately formed, process time is increased, so that production yield is lowered.

SUMMARY

By way of introduction only, as embodied and broadly described herein, an IPS mode LCD of one aspect includes: a first substrate and a second substrate; a thin film transistor and a color filter layer on the first substrate; a common electrode and a pixel electrode arranged in a zigzag configuration on the first substrate; and a liquid crystal layer between the first and second substrates.

According to another aspect of the present invention, a method of fabricating an IPS mode LCD is provided that includes: forming a color filter layer and a thin film transistor on a first substrate; forming a common electrode and a pixel electrode in a zigzag configuration on the thin film transistor;

and forming a liquid crystal layer between the first substrate and a second substrate facing the first substrate. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A through 4C illustrate a method of fabricating an IPS mode LCD according to an embodiment of the present invention;

DETAILED DESCRIPTION

The present invention will now be described more fully with reference to the accompanying drawings, in which exemplary embodiments of the invention are shown.

Figure 1:
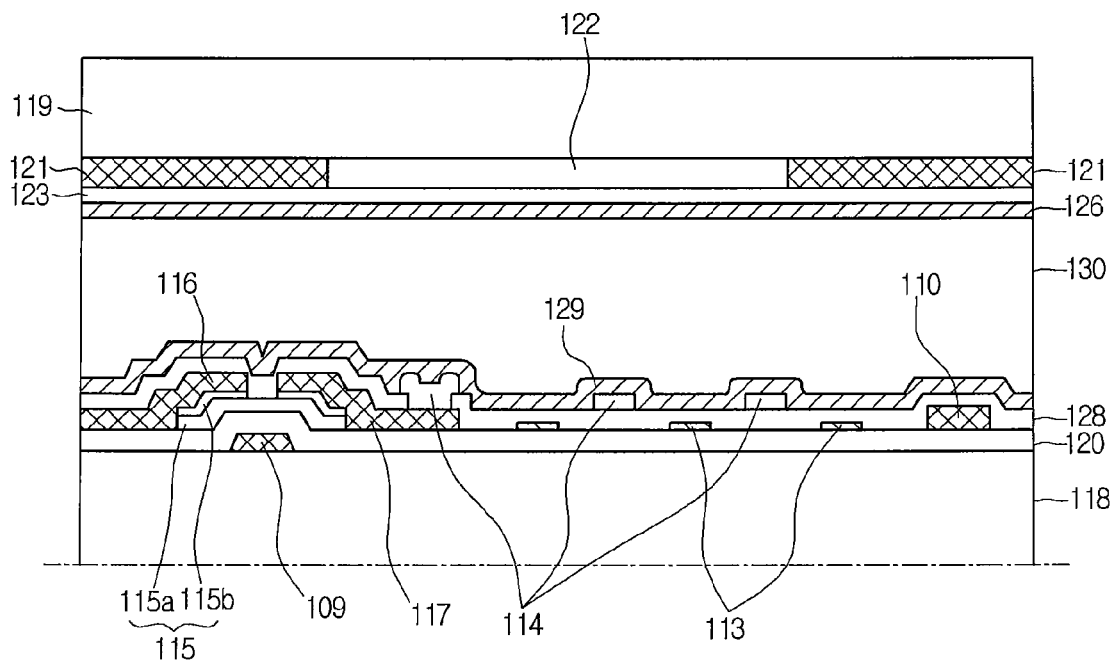
FIG. 1 is a sectional view of a related art IPS mode LCD according to the related art.
Figure 2:
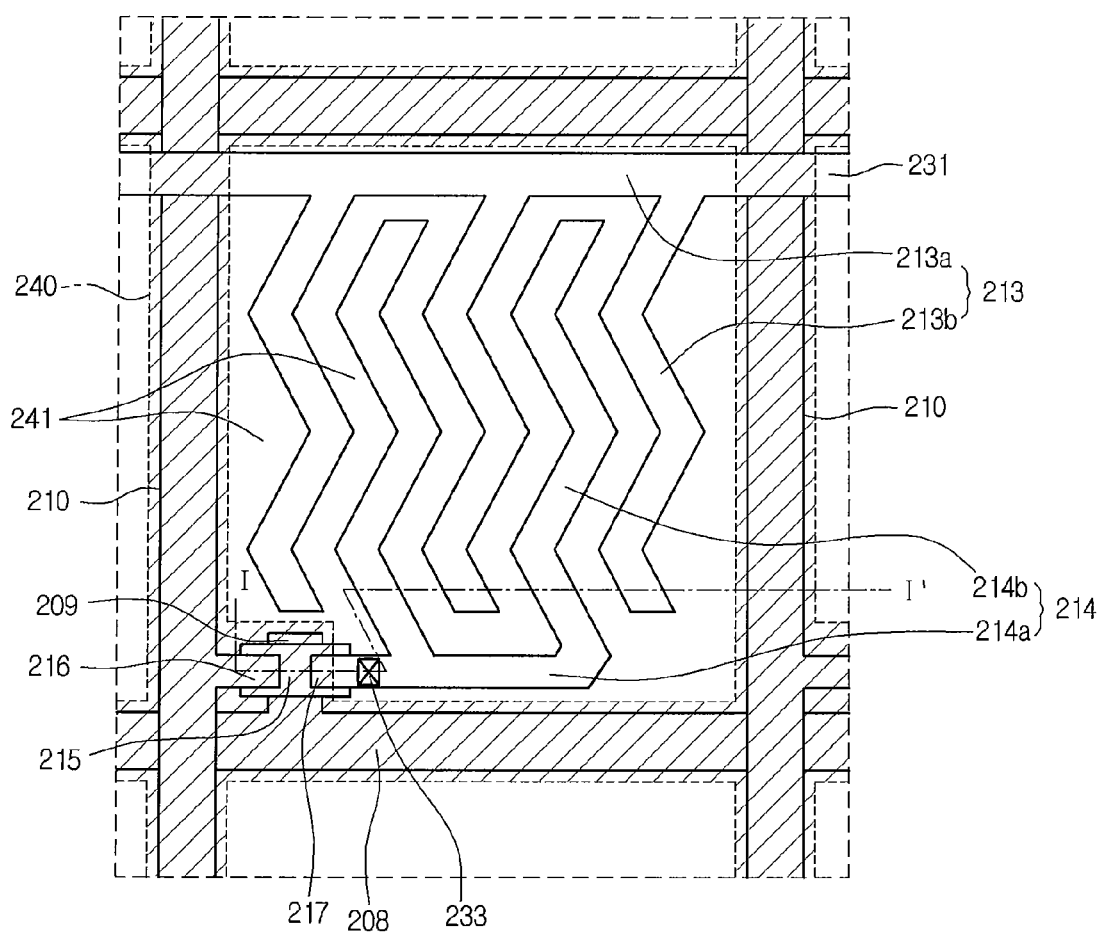
FIG. 2 is a plane view illustrating a schematic configuration of an IPS mode LCD having a COT structure according to an embodiment of the present invention.
Figure 3:
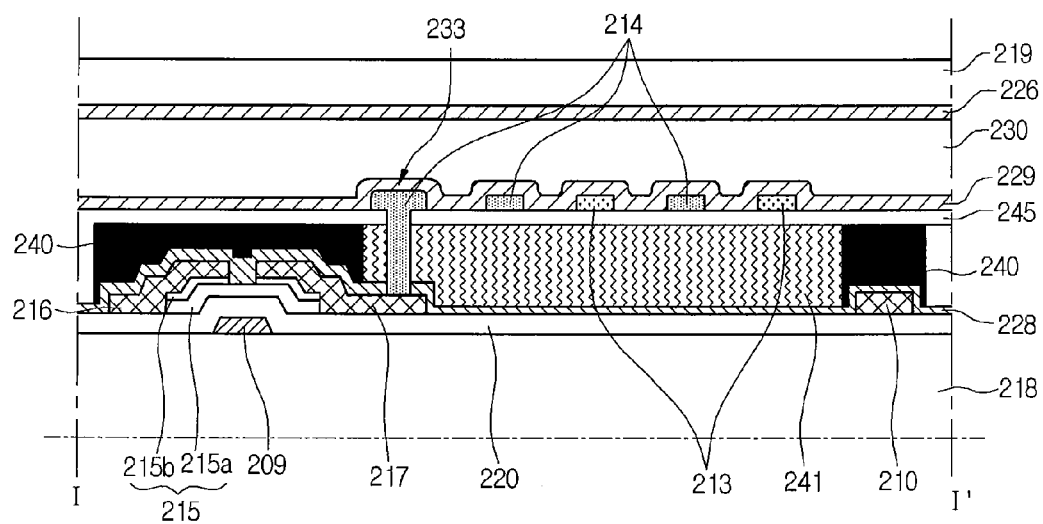
FIG. 3 is a sectional view taken along the line I-I' of FIG. 2.

FIG. 2 is a plane view illustrating a schematic configuration of an IPS mode LCD having a COT structure according to an embodiment of the present invention, and FIG. 3 is a sectional view taken along the line I-I' of FIG. 2.

The IPS mode LCD has a color filter on TFT (COT) structure that a color filter layer is formed on an array substrate including a thin film transistor and prevents light passing through the common electrode and the pixel electrode from being absorbed into the color filter layer, thereby enhancing brightness. Alternatively, the IPS mode LCD can be equivalently applied to IPS mode LCDs having a TFT on color filter (TOC) structure.

As shown in FIG. 2, an array substrate of the IPS mode LCD is configured to include a plurality of gate lines 208 arranged spaced apart by a predetermined distance in parallel with each other in a first direction, a common line 231 arranged adjacent to and in parallel with the gate lines 208, and a plurality of data lines 210 perpendicularly crossing the gate lines 208 and the common line 231, and defining a pixel region together with the gate lines 208. The gate lines 208 and the data lines 210 are formed by depositing a metal film such as Al, Cu, Ta, Ti, Mo, a Mo alloy, an Al alloy and the like and patterning the deposited metal film.

A thin film transistor (TFT) including a gate electrode 209, semiconductor layer 215, a source electrode 216, and a drain electrode 217 is formed at a crossing point of the gate line 208 and the data line 210. The source electrode 216 is connected with the data line 210 and the gate electrode is connected with the gate line 208. On the pixel region, a pixel electrode 214 connected with the drain electrode 217, and a common electrode 213 arranged in parallel with the pixel electrode 214 and connected with the common line 231 are formed. The common line 231 may be formed extending on the gate line 208 to form a storage capacitor.

The pixel electrode 214 includes a plurality of vertical parts 214b and a single horizontal part 214a. The plurality of vertical parts 214b are electrically connected with the drain electrode 217 through a drain contact hole 233 and are spaced apart by a predetermined interval from one another. Also, the single horizontal part 214a connects the plurality of vertical parts 214b as one body.

The common electrode 213 includes a plurality of vertical parts 213b and a single horizontal part 213a. The plurality of vertical parts 213b extend downward from the common line 231, and are interdigitally arranged with the vertical parts 214b of the pixel electrode 214, and the horizontal part 213a connects the plurality of vertical parts 213b as one body.

In particular, the vertical parts 213b of the common electrode 213 are interdigitally arranged with and the vertical parts 214b of the pixel electrode 214 in a zigzag configuration. As shown in FIG. 2, by forming the common electrode 213 and the pixel electrode 214 in a bent structure of a zigzag configuration and performing an alignment process in one direction, it is possible to change the direction of an electric field applied to the injected liquid crystal.

The bend angle may be set to be less than 30° or in a range of 60-120° except for 90° with respect to the alignment direction of the liquid crystal layer by the alignment process (i.e., rubbing process). Specifically, the bend angle is set to be less than 30° when the dielectric anisotropy is positive, or to be in a range of 60-120° except for 90° when the dielectric anisotropy is negative. Chiral dopants may be added to the liquid crystal layer.

Thus, the common electrode 213 and the pixel electrode 214 are arranged such that alignment characteristic of the liquid crystal are symmetric to each other. Accordingly, liquid crystal molecules on a unit pixel region are aligned only in one direction but in multiple directions, thereby inducing multiple domains permitting a variety of alignment directions in one pixel region.

The data lines 210, the pixel electrode 214 and/or the common electrode 213 has a bent structure. To prevent light leakage, a black matrix layer 240 is formed on the gate lines 208, the data lines 210 and the TFT region. A color filter layer 241 is also formed to display a desired color on the pixel region defined by the gate lines 208 and the data lines 210 crossing the gate lines 208. If the data lines 210 are formed in a zigzag configuration, the black matrix layer and the color filter layer 241 are formed in a zigzag pattern.

The order of processes of forming the color filter layer 241 and the black matrix layer 240 may be exchanged. Also, the color filter layer 241 and the black matrix layer 240 may be formed on different layers. Alternatively, the black matrix layer 240 may be formed on the other substrate.

Referring to FIG. 3, the IPS mode LCD is formed by attaching a first substrate 218 and a second substrate 219 facing the first substrate 218, and forming a liquid crystal layer 230 between the first substrate 218 and the second substrate 219. In more detail, a metal film is deposited on the first substrate 218 and is then patterned to form the plurality of gate lines (see 208 of FIG. 2), and the gate electrode 209 branched from the gate line 208 and extending to the TFT site.

Next, a gate insulating layer 220 is formed on the entire surface of the first substrate 218 including the gate electrode 209, and then a semiconductor layer 215 including an active layer 215a and an ohmic contact layer 215b is formed on the gate insulating layer 220. Also, the data line 210 is formed on the gate insulating layer 220 so as to form a matrix configuration together with the gate line 208. The source electrode 216 and drain electrode 217 of a thin film transistor are formed concurrently with the date line 210 while the data line 210 is formed.

A passivation layer 228 is formed on the thin film transistor. The passivation layer 228 may be formed from an organic material such as a photo-acryl and BCB (benzo cyclobutene) or inorganic materials such as silicon oxide (SiOx) and silicon nitride (SiNx).

The color filter layer 241 including a drain contact hole 233 is formed on the source/drain electrode 216/217 and the gate insulating layer 220 of the pixel region. An overcoat layer 245 may be formed on an entire surface of a resultant structure of the first substrate 218 including the color filter layer 241 so as to planarize the resultant structure of the first substrate 218. The overcoat layer 245 also may be omitted. The overcoat layer 245 is formed of a film of organic or inorganic material. On the overcoat layer 245, the common electrode 213 and the pixel electrode 214 are formed.

The common electrode 213 and the pixel electrode 214 are formed of a transparent conductive material such as indium tin oxide (ITO) or indium zinc oxide (IZO) through which light passes well. The common electrode 213 and the pixel electrode 214 are formed in a zigzag configuration. In addition to the common electrode 213 and the pixel electrode 214, the data lines 210 may be also formed in a zigzag configuration. Further, the black matrix layer 240 and the color filter layer 241 may be formed in a zigzag configuration.

The black matrix layer 240 is formed on the TFT region, the gate lines 208 and the data lines 210 to prevent light from being leaked. First and second alignment layers 229 and 226 are coated on facing surfaces of the first substrate 218 and the second substrate 219.

In the IPS mode LCD having a color filter on transistor (COT) structure, to prevent the color filter layer 241 from absorbing light at regions where the common electrode 213 and the pixel electrode 214 are positioned, the color filter layer 241 on the regions where the common electrode 213 and the pixel electrode 214 are positioned is removed and a hole may be formed instead of the color filter layer 241.

Figure 4A:
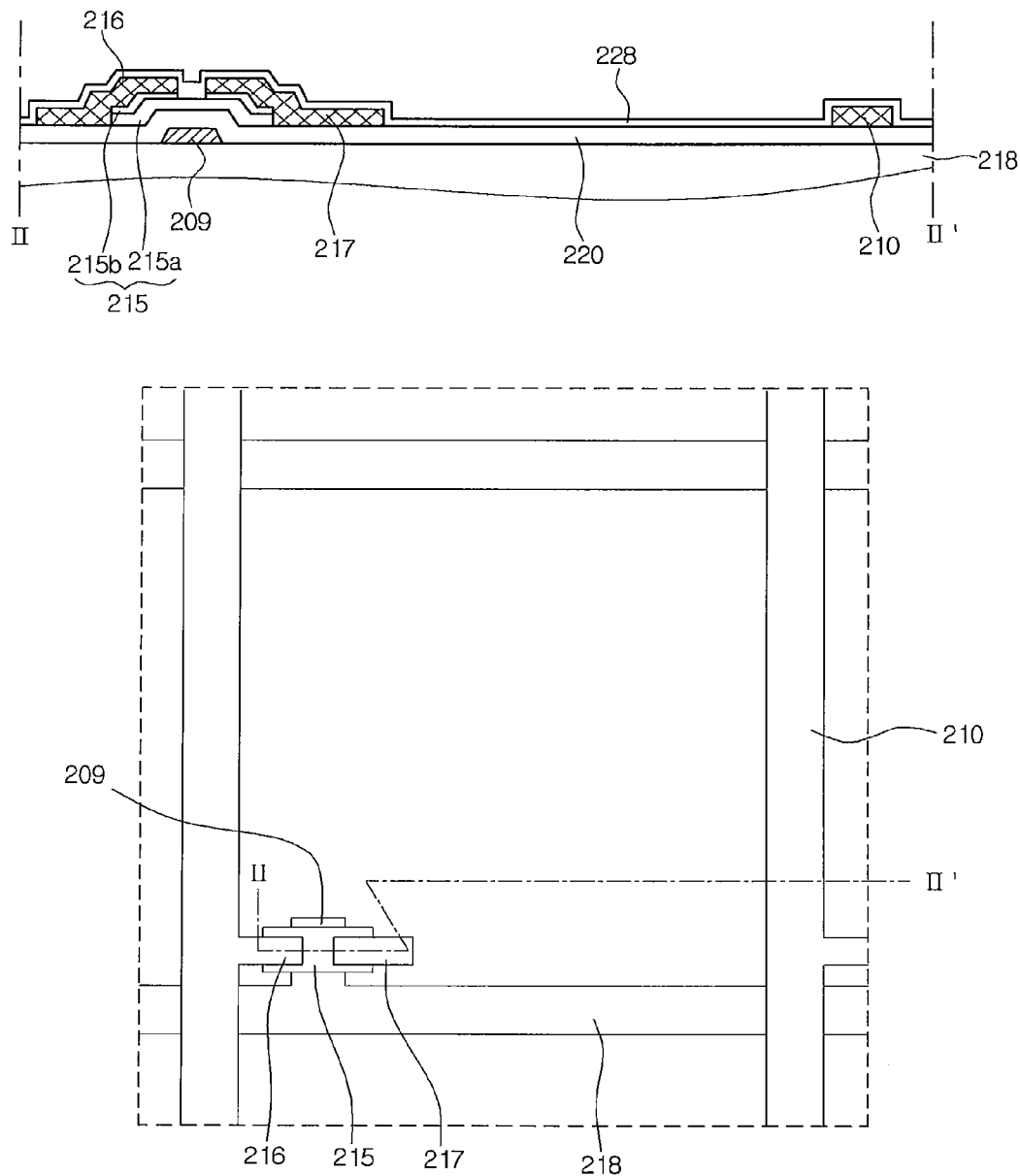
Figure 4B:
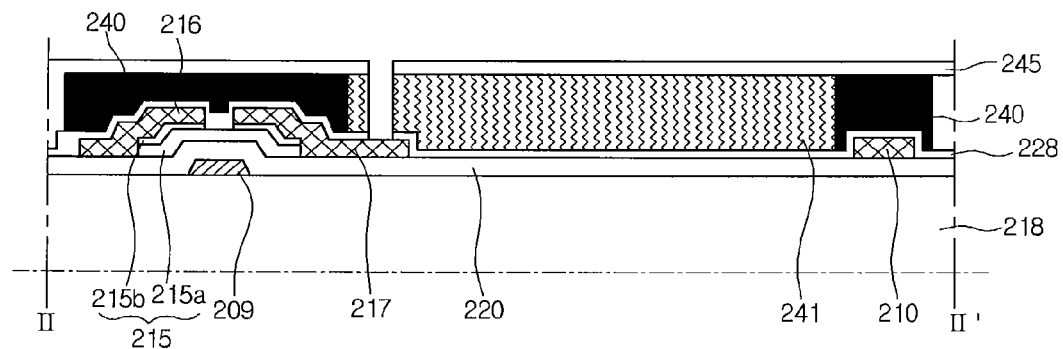
Figure 4B:
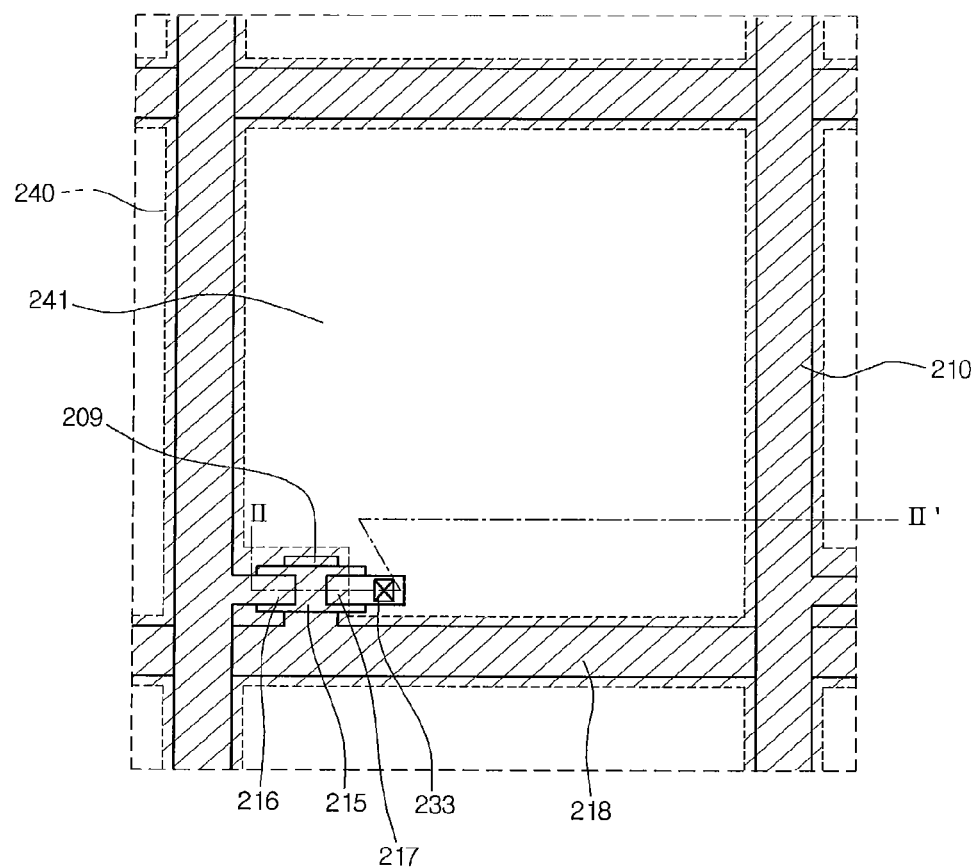

Hereinafter, a method of fabricating the IPS mode LCD having the COT will be described. FIGS. 4A through 4C illustrate a method of fabricating an IPS mode LCD according to an embodiment of the present invention.

First, referring to FIG. 4A, a metal film is deposited on a substrate 218 and is then patterned to form a plurality of gate lines 208, and a gate electrode 209 branched from each of the gate lines 208 at a TFT site. Next, a gate insulating layer 220 is formed on an entire surface of the substrate 218 including the gate electrode 209, and then a semiconductor layer 215 including an active layer 215a and an ohmic contact layer 215b is formed on the gate insulating layer 220. Next, a plurality of data lines 210 are formed on the gate insulating layer 220 so as to form a matrix configuration together with the gate lines 208. Source and drain electrodes 216 and 217 of a TFT are formed concurrently with the data lines 210 while the data lines 210 are formed. The gate lines 208 and the data lines 210 are formed by depositing a metal film such as Al, Cu, Ta, Ti, Mo, a Mo ally, an Al alloy and the like and patterning the deposited metal film.

Referring to FIG. 4B, a black resin is coated on an entire surface of a resultant structure of the substrate 218 and is then patterned to form a black matrix layer 240 on the TFT, the data line 210 and the gate line 208. Next, a color filter layer 241 is formed on the substrate 218 including the black matrix layer 240, and a drain contact hole 233 exposing the drain electrode 217 is formed in the color filter layer 241. At this time, the order of processes of forming the black matrix layer 240 and the color filter layer 241 may be exchanged. The color filter layer 241 may be formed by printing, dyeing, polymer electrodeposition, ink jet deposition, pigment dispersion or the like.

After the black matrix layer 240 and the color filter layer 241 are formed as above, an overcoat layer 245 is formed on an entire surface of the substrate 218 including the color filter layer 241 so as to planarize the substrate 218 as shown in FIG. 4C. The overcoat layer 245 may be an organic material such as photo-acryl and BCB (benzo cyclobutene) or an inorganic material such as silicon oxide (SiOx) or silicon nitride (SiNx). Alternatively, the overcoat layer 245 may be omitted.

A common electrode 213 and a pixel electrode 214 are formed on the overcoat layer 245. At this time, the drain electrode 217 is electrically connected with the pixel electrode 214 through the drain contact hole 233. The common electrode 213 and the pixel electrode 214 are formed of a transparent conductive material such as indium tin oxide (ITO) or indium zinc oxide (IZO) through which light passes.

As shown in the plane view of FIG. 4C, the common electrode 213 and the pixel electrode 214 are formed in a zigzag configuration. In addition to the common electrode 213 and the pixel electrode 214, the data lines 210 may be also formed in a zigzag configuration. Further, the black matrix layer 240 and the color filter layer 241 may be formed in a zigzag configuration.

Thus, by arranging electrodes formed on a unit pixel in a zigzag configuration, aligned liquid crystal molecules have a symmetric alignment characteristic. As a result, liquid crystal molecules on one pixel may be aligned into multi-domains having at least two domains, birefringence depending on the alignment direction of liquid crystal molecules is offset, thereby minimizing color shift phenomenon. Also, it becomes possible to widen a region where gray scale inversion does not exist, thereby enhancing viewing angle characteristic.

Next, an alignment material is formed on an entire surface of a resultant structure of the substrate 218 to form an alignment layer 229. The alignment material may be polyimide, polyamide or the like.

Figure 5A:
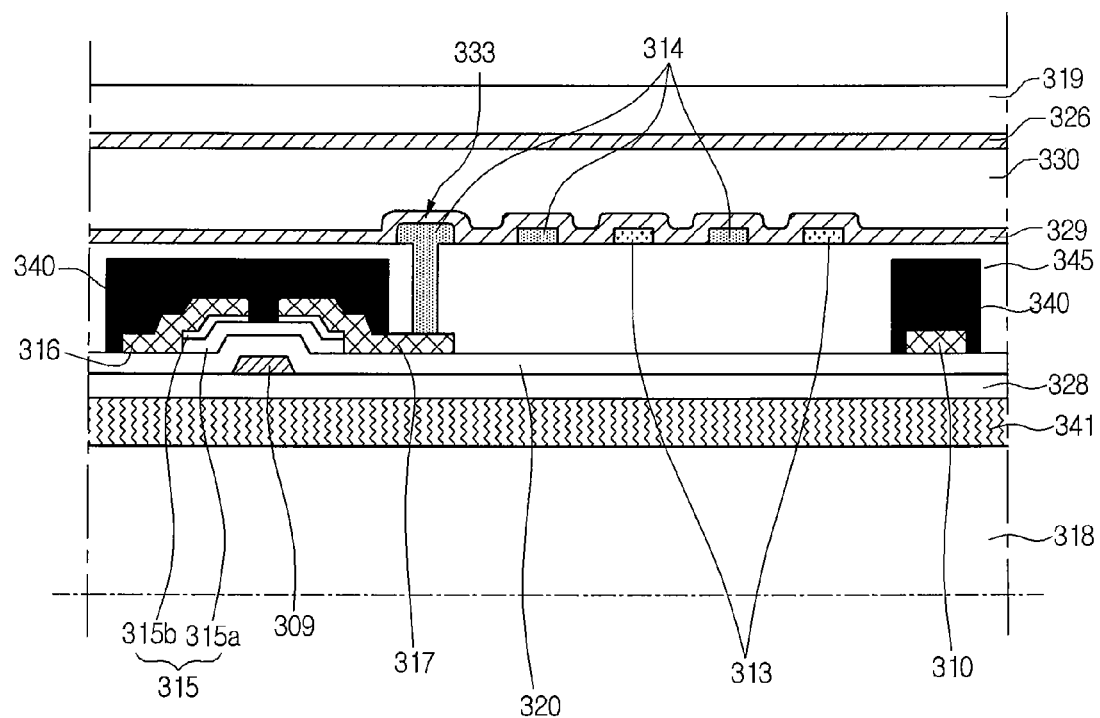
FIGS. 5A and 5B are sectional views illustrating a schematic configuration of an IPS mode LCD having a TOC structure according to another embodiment of the present invention.
Figure 5B:
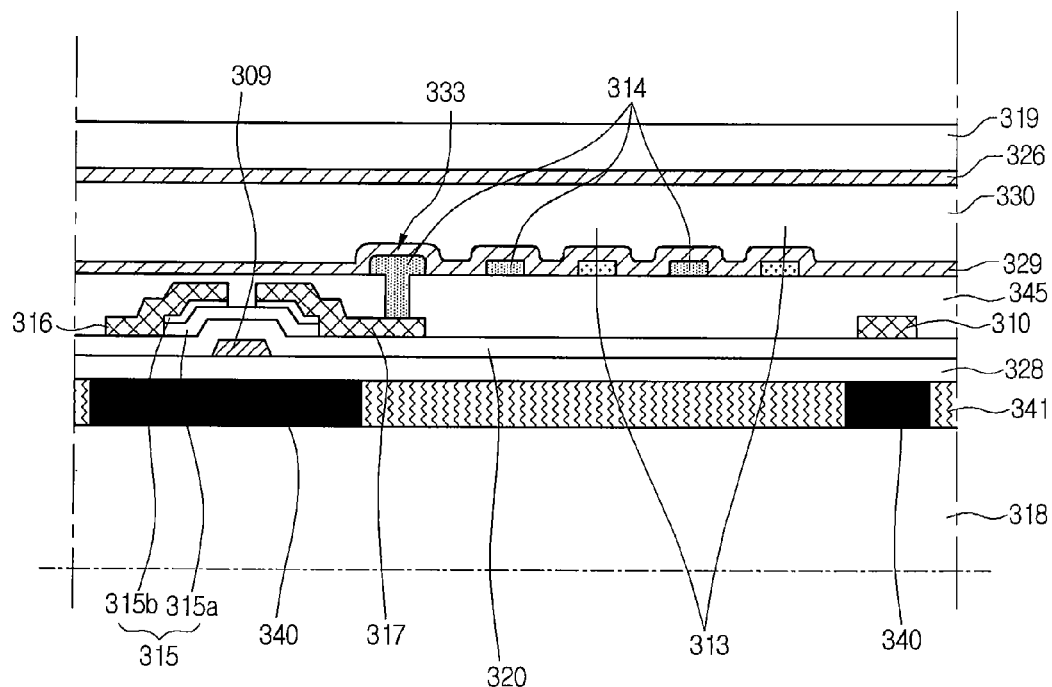

Although the present embodiment shows and describes the IPS mode LCD having the COT structure, the effects of the first embodiment can be applied to an IPS mode LCD having a TOC structure. FIGS. 5A and 5B are sectional views illustrating a schematic configuration of an MPS mode LCD having a TFT on color filter (TOC) structure according to another embodiment of the present invention, and taken along the line I-I' like in FIG. 2.

Referring to FIG. 5A, the IPS mode LCD having the TOC structure includes a first transparent substrate 318, a color filter layer 341 formed on the first transparent substrate 318, and an overcoat layer 328 formed on the color filter layer 341, for protecting the color filter layer 341. Alternatively, the overcoat layer 328 may be omitted.

A thin film transistor (TFT) is formed on the overcoat layer 328. In detail, a gate electrode 309 is first formed on the overcoat layer 328, a gate insulating layer 320 is formed on an entire surface of the first transparent substrate 318 including the gate electrode 309, a semiconductor layer including an active layer 315a and an ohmic contact layer 315b is formed on the gate insulating layer 320, and a source/drain electrode 316/317 is formed on the semiconductor layer 315.

To prevent light leakage, a black matrix layer 340 is formed on the TFT and the gate line 310. A passivation layer 345 is formed on an entire surface of the first transparent substrate 318 including the black matrix layer 340 and the TFT. A drain contact hole 333 is formed in the passivation layer 345 so as to electrically connect the drain electrode 317 with a pixel electrode 314.

A common electrode 313 is formed interdigitally with the pixel electrode 314 in a zigzag configuration. The pixel electrode 314 is electrically connected with the drain electrode 317 through the drain contact hole 333. In addition to the common electrode 313 and the pixel electrode 314, the data line 310 may be also formed in a zigzag configuration.

The common electrode 313 and the pixel electrode 314 are formed of a transparent conductive material such as indium tin oxide (ITO) or indium zinc oxide (IZO) through which light passes. First and second alignment layers 329 and 326 are coated on facing surfaces of the first substrate 318 and a second substrate 319. Alternatively, the black matrix layer 340 may be formed below the TFT.

Figure 6A:
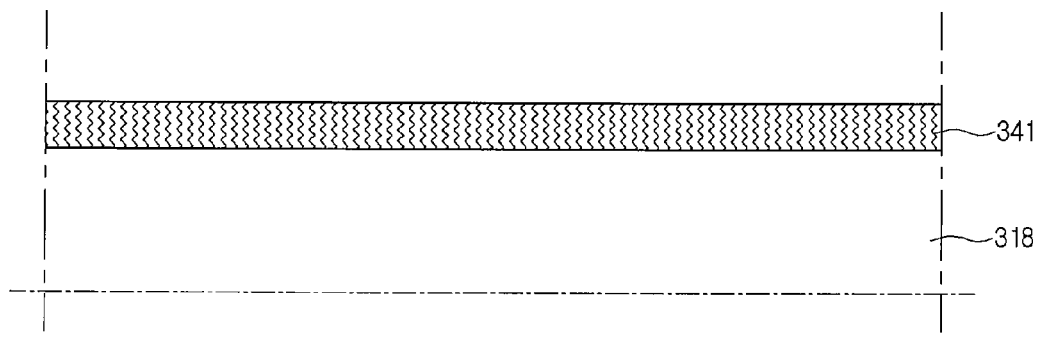
FIGS. 6A through 6C illustrate a method of fabricating an IPS mode LCD having a TOC structure according to another embodiment of the present invention.
Figure 6B:
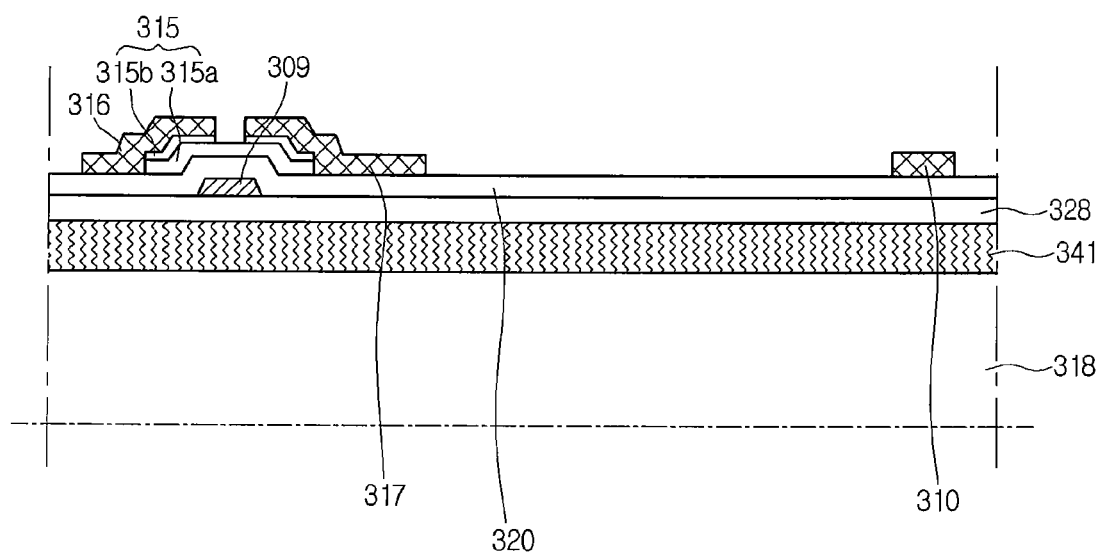
Figure 6C:
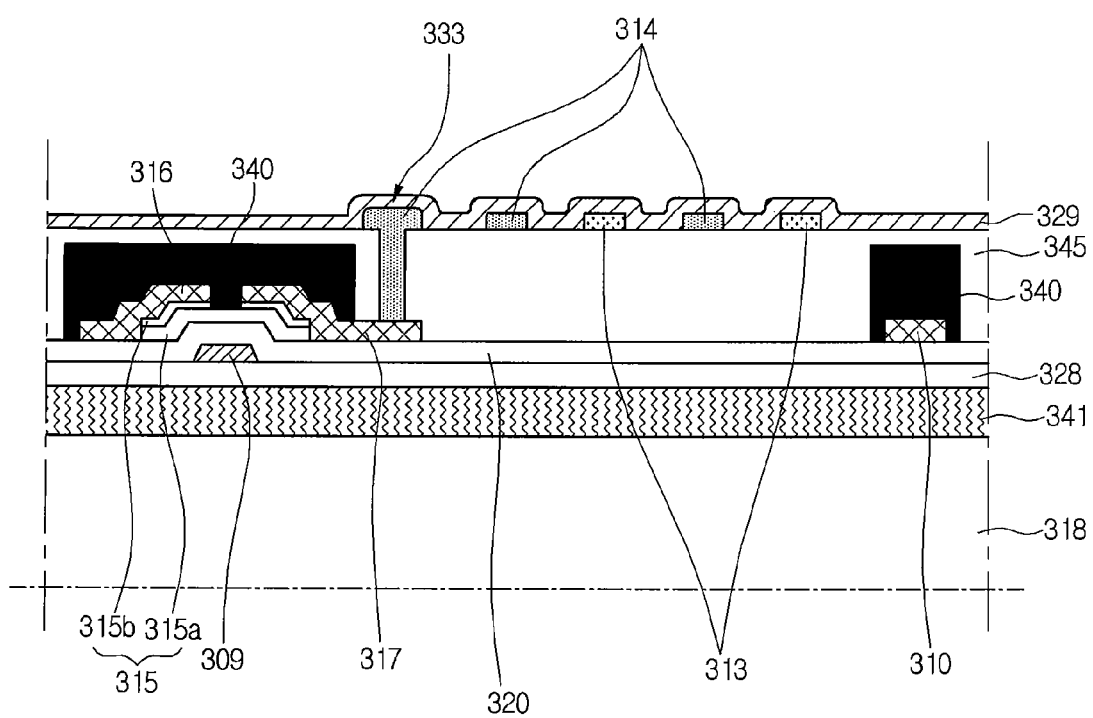

Hereinafter, a method of fabricating the IPS mode LCD having the TOC structure shown in FIG. 5A will be described in detail. FIGS. 6A through 6C illustrate a method of fabricating an IPS mode LCD having a TOC structure according to another embodiment of the present invention.

First, referring to FIG. 6A, red (R), green (G) and blue (B) color filters is selected and coated on the substrate 318 to form a color filter layer 341. The color filter layer 341 is formed by printing, dyeing, polymer electrodeposition, pigment dispersion, ink jet deposition or the like. In pigment dispersion, a photosensitive resist film colored by a prepared pigment is coated on the substrate, patterned by an exposure, and developed to form the color filter layer 341. The color filter layer 341 is, for example, formed from acryl resin or the like. In other words, the acryl resin is patterned by a pre-bake, an exposure, a development, and a post-bake.

After the color filter layer 341 is formed as above, a thin film transistor (TFT) is formed on the resultant substrate including the color filter layer 341 as shown in FIG. 6B. Prior to forming the TFT, an overcoat layer is first formed of a BCB or a photo acryl material on the color filter layer 341. Thereafter, a metal film is deposited on the overcoat layer 328 and is then patterned, thereby forming a plurality of gate lines 308 and a gate electrode 309 branched from each of the gate lines 308 at a TFT site Next, a gate insulating layer 320 is formed on an entire surface of the substrate 318 including the gate electrode 309, and then a semiconductor layer 315 including an active layer 315a and an ohmic contact layer 315b is formed on the gate insulating layer 320.

Next, a plurality of data lines 310 are formed on the gate insulating layer 320 so as to form a matrix configuration together with the gate lines 308. Source and drain electrodes 316 and 317 of the TFT are formed concurrently with the data lines 310 while the data lines 310 are formed. The gate lines 308 and the data lines 310 are formed by depositing a metal film such as Al, Cu, Ta, Ti, Mo, a Mo ally, an Al alloy and the like and patterning the deposited metal film.

Referring to FIG. 6C, a black resin is coated on an entire surface of a resultant structure of the substrate 318 including the TFT and is then patterned to form a black matrix layer 340 on the TFT, the data line 310 and the gate line 308. Next, a passivation layer 345 is formed on the resultant substrate 318 including the black matrix layer 340. The passivation layer 345 may be formed of organic materials such as a photo-acryl or BCB (benzo cyclobutene) or inorganic materials such as silicon oxide (SiOx) and a silicon nitride (SiNx).

After the passivation layer 345 is formed, a drain contact hole 333 exposing the drain electrode 317 is formed in the passivation layer 345. A common electrode 313 and a pixel electrode 314 are formed on the passivation layer 345 including the drain contact hole 333. At this time, the drain electrode 317 is electrically connected with the pixel electrode 314 through the drain contact hole 333.

The common electrode 313 and the pixel electrode 314 are formed of a transparent conductive material such as indium tin oxide (ITO) or indium zinc oxide (IZO) through which light passes. The common electrode 313 and the pixel electrode 314 are formed in a zigzag configuration. In addition to the common electrode 313 and the pixel electrode 314, the data lines 310 may be also formed in a zigzag configuration. Further, the black matrix layer 340 and the color filter layer 341 may be formed in a zigzag configuration.

Thus, by arranging electrodes formed on a unit pixel in a zigzag configuration, aligned liquid crystal molecules have a symmetric alignment characteristic. As a result, liquid crystal molecules on one pixel may be aligned into multiple domains having at least two domains, birefringence depending on the alignment direction of liquid crystal molecules is offset, thereby minimizing color shift phenomenon. Also, it becomes possible to widen a region where gray scale inversion does not exist, thereby enhancing viewing angle characteristic.

Next, an alignment material is formed on an entire surface of a resultant structure of the substrate 318 to form an alignment layer 329. The alignment material may be polyimide, polyamide or the like.

As described above, in the IPS mode LCD of the present invention, the color filter layer is formed on the same substrate as the TFT and electrode patterns are arranged in a zigzag configuration, thereby inducing multiple domains to offset birefringence depending on the alignment direction of liquid crystal molecules and to minimize color shift phenomenon. Also, it becomes possible to widen a region where gray scale inversion does not exist, thereby enhancing viewing angle characteristic. Also, in the present invention, the color filter layer is formed on the same substrate as the TFT, thereby enhancing color reproducibility and reducing process time to enhance the production yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching (IPS) mode liquid crystal display (LCD) comprising:
   a first substrate and a second substrate;
   a color filter layer on the first substrate;
   a gate insulating layer on an entire region of the color filter layer;
   a thin film transistor on the gate insulating layer;
   a black matrix layer on at least the thin film transistor;
   a passivation layer configured to contact the black matrix layer and the gate insulating layer;
   a common electrode and a pixel electrode arranged in a zigzag configuration on the first substrate; and
   a liquid crystal layer between the first and second substrates,
   wherein the black matrix layer and the pixel electrode are spaced apart from each other on the first substrate.

2. The IPS mode LCD of claim 1, further comprising:
   a gate line and a data line crossing with each other on the color filter layer and defining a pixel region, wherein the black matrix layer is disposed on the thin film transistor, the gate line and the data line.

3. The IPS mode LCD of claim 1, wherein the passivation layer covers upper and side surfaces of the black matrix.

4. The IPS mode LCD of claim 1, wherein the common electrode and the pixel electrode is disposed directly on the passivation layer.

5. The IPS mode LCD of claim 1, wherein the passivation layer is disposed in a pixel region laterally adjacent to the black matrix layer.

6. The IPS mode LCD of claim 2, wherein the black matrix layer is formed of black resin.

7. The IPS mode LCD of claim 1, further comprising an overcoat layer between the color filter layer and the thin film transistor.

8. The IPS mode LCD of claim 1, further comprising alignment films disposed on the first and second substrates.

9. The IPS mode LCD of claim 1, wherein the zigzag configuration has a bend angle less than 30° with respect to an alignment direction of the liquid crystal layer.

10. The IPS mode LCD of claim 1, wherein the zigzag configuration has a bend angle range of 60-120°, except 90°, with respect to an alignment direction of the liquid crystal layer.

11. The IPS mode LCD of claim 1, wherein the common and pixel electrodes are formed of a transparent conductive material.

12. The IPS mode LCD of claim 4, further comprising a common line adjacent to the gate line and in parallel with the gate line, wherein the common line is formed to extend from the common electrode, and wherein the common line is disposed directly on the passivation layer.

13. The IPS mode LCD of claim 1, wherein a first upper portion of the passivation layer corresponding to the black matrix has the same plane surface as that of a second upper portion of the passivation layer corresponding to the gate insulating layer.

14. The IPS mode LCD of claim 1, wherein the black matrix layer is spaced apart from the color filter layer.

* * * * *